Figure 1:
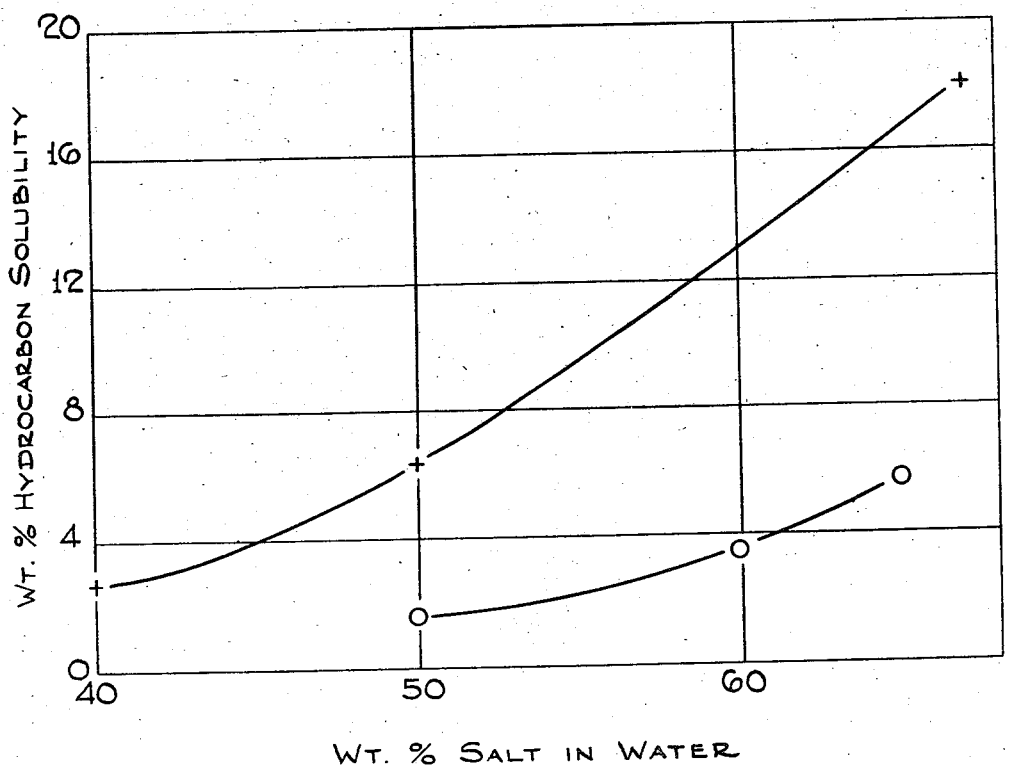

Patented Sept. 11, 1951

2,567,228

UNITED STATES PATENT OFFICE 2,567,228

EXTRACTIVE DISTILLATION OF CLOSE-BOILING HYDROCARBON FRACTIONS WITH HYDROTROPIC SOLUTIONS

Charles E. Morrell, Westfield, Carl S. Carlson, Roselle, and Joseph F. Nelson, Rahway, N. J., and Joseph Stewart, Brooklyn, N. Y., assignors to Standard Oil Development Company, a corporation of Delaware Application January 3, 1949, Serial No. 68,836

27 Claims. (Cl. 202—39.5)

This case relates to a novel method for separation of hydrocarbons. Specifically, this novel method involves the use of solubilizers in extractive process for the separation of specific components in mixtures of close-boiling hydrocarbons.

It is well known that, in certain cases, relatively closely boiling hydrocarbons which cannot be separated by conventional fractional distillation methods, can be satisfactorily separated by using certain solvents in extractive distillation methods. These methods, however, have a somewhat limited application in the types of selective separations which can be accomplished. It has been suggested that certain modifications of this method could be used and that they might also be employed in conjunction with other separation techniques to make the method more widely applicable. In spite of such refinements, however, there are many highly desirable separations of hydrocarbons which it has not heretofore been possible to carry out satisfactorily by employing extractive distillation techniques. This is particularly true where the components of the mixtures have very close boiling points and quite similar chemical structures.

It has now been discovered that by the use of certain very specific compounds which may be broadly called solubilizers or solubilizing assistants these extractive distillation separations of close-boiling hydrocarbons can be accomplished to give a high degree of specificity and purity of products. These solubilizers are of use broadly in any type of extractive method using extracting solvents where the method is based on vapor-liquid contact. Solutions of these solubilizers have been found particularly valuable in vapor-liquid contacting methods using so-called extractive distillation techniques for the separation of closely boiling hydrocarbons.

Under certain conditions of operation, some non-aqueous types of solvents used in conjunction with the solubilizers offer valuable separation techniques for hydrocarbon mixtures. In general, the non-aqueous solvents which are useful are those with more than one functional group of the polar type and having somewhat similar solvent properties to aqueous mixtures, although this is not absolutely necessary. These polyfunctional compounds frequently have limited solubilities in the hydrocarbons. As examples of this type of solvent there may be included polyhydroxy compounds, glycerol, ethylene glycol, diethylene glycol, polyamines, and alkanolamines such as ethanolamine and the di- and triethanol amines.

When water is used as the solvent in extractive distillation techniques the useful solubilizers can be a wide variety of organic compounds which promote to a more or less degree specific increased solubilities of certain hydrocarbons in the aqueous phase in preference to other hydrocarbons which may be present. Many types of these chemical agents which are sometimes designated collectively as hydrotropic agents are known and described in the literature, since their properties have made them useful in other fields. In the art the term hydrotropic agents is used for highly polar compounds which, when added to a polar liquid, increases the solubility of solutes in that liquid. Those which are most useful for this invention are hydrotropic organic solubilizers and are preferably salts of organic compounds. They must be capable of dissolving in water or other selective polar solvents of limited miscibility with the organic substances to be separated in order to form a single phase of a liquid nature. In general, this requires the formation of a true solution, although a colloidally dispersed system is also possible. The solubility of the solubilizing agent in the aqueous phase should be of a relatively high order of magnitude. For best results in most separations a solubility of at least 40 percent by weight of the solubilizer is required, although, broadly, concentrations of 3 to 70 percent or more of such solubilizer of adequate solubility may be employed. In general there is an optimum range of solubility of the solubilizing agent for any particular separation.

For aqueous solutions the compounds have a basic carbon skeleton containing generally not more than twelve or fifteen carbon atoms, since compounds containing more than that number have a relatively low solubility in water which may render them almost wholly useless. Such high molecular weight hydrocarbon residues outweigh the solubilizing effect of the polar groups. The carbon skeleton may be of the class of aliphatic, alicyclic, or aromatic and may be either carbocyclic or heterocyclic in nature. It has been found that better solubilizers for the most specific separations in the aromatic series are those having cyclic nuclei which are of the aromatic series such as benzene and naphthalene. Those solubilizers derived from the mononuclear aromatics are especially valuable because of high solubility and ready availability.

These nuclei must have as substituents one or more polar radicals or solubilizing groups such as a sulfonic acid, a carboxylic acid, a quaternary amine salt, a sulfate, or a phosphonate. These may be used in the form of the free acid or base or, preferably, they may be used as the more soluble salts. Suitable salts include the alkali metal salts such as sodium, potassium, or lithium. Also useful are the ammonium or amine salts. In most cases the water-soluble salts are especially desirable. It is even possible to use a hydrotropic compound having an acidic group and a hydrotropic agent having a basic group to form a salt therewith having dual action which has an enhanced effect over either of the compounds where used alone. In general the water-soluble salts of the mononuclear aromatic sulfonic acids have been found particularly valuable as hydrotropic organic solubilizers.

Other groups may also be present on the solubilized nuclei and in most cases such groups are highly desirable and should be selected with special attention to the desired separation as they lend the solubilizer compound its specificity. Groups of this type which may be present include alkyl, halogen, hydroxy, nitro, alkoxy, and amino both substituted and unsubstituted. For specific separations of isomeric alkyl substituted aromatic hydrocarbon mixtures it has been found advantageous to have present a multiplicity of alkyl groups on the nucleus of the solubilizer. Dialkyl mononuclear aromatic sulfonates as, for example, the dimethyl aromatic sulfonates have been found particularly useful for separations of $C_3$ aromatic hydrocarbons and mixtures of the xylene isomers.

A large number of salts, and in some cases the acids, can be used as solubilizers. These include the sodium, potassium, lithium, ammonium, and amines salts of acids.

As specific examples of compounds which are useful there may be named the water-soluble salts of benzene sulfonic acid, salicylic acid, phthalic and terephthalic acids, toluene sulfonic acids, xylene sulfonic acids, naphthalene sulfonic acids, dimethylaniline sulfonic acid, naphthol sulfonic acids, naphthylamine sulfonic acids, nitrobenzene sulfonic acids, chlorobenzoic acids, thiophene carboxylic acids, nitrophthalic acid, camphoric acid, cyclohexane sulfonic acid, taurine, amino acids, sodium lauryl sulfonate, methane and ethane sulfonic acids, ethionic acid, furoic acid, citric acid, and anthraquinone sulfonic acids. Substituted amine salts, for instance, pyridinium salts such as the chlorides and sulfates, which are water soluble are also to be considered within the scope of this invention.

The water-soluble salts, and particularly the readily available sodium salts, of the sulfonic acids have been found convenient since they give superior results as solubilizers and, in addition, are readily available by standard sulfonation techniques.

In many separation, it is desirable to use mixtures of solubilizers to obtain maximum efficiency in separations and it is considered within the scope of this invention to employ either single hydrotropic agents or mixtures of such agents.

While these solubilizers are ordinarily to be used in aqueous mixtures, other substances as auxiliary solubilizers may also be present and may actually be of especial value. In some instances such additional agents may serve a very useful function, causing significant increases in the solubilities of the hydrocarbons in the aqueous mixtures. Modifying agents of this type include various soluble inorganic salts such as the alkali metal salts. Potassium sulfate has been found to be of particular value as an auxiliary solubilizer. Other water-soluble salts can also be present in the extractive solvent mixture and, in general, they produce no undue deleterious effects on the operation. The salts so used should preferably be derived from relatively strong bases and strong acids so that hydrolysis will be minimal.

The water phase may also be modified by certain selective organic compounds. In cases of low hydrocarbon solubility in the solvent phase, that is, the aqueous solution of the solubilizer, certain of these auxiliary agents have been found to increase the hydrocarbon solubility in the aqueous solvent by as much as 100 percent. Other compounds which may be present include: alcohols having 1-10 carbon atoms such as methyl, ethyl, propyl, isopropyl, and butyl alcohols, low molecular weight polyhydric compounds such as ethylene glycol, propylene glycol and glycerol, alkoxy alcohols, sulfolanes, ketones, ethers, both aliphatic and alicyclic, phenols, cresols, phenates, and various amines of the aliphatic, alicyclic, aromatic, and heterocyclic classes such as ethylamine, butylamine, the amylamines, cyclohexylamine, aniline, n-substituted anilines, pyridine, lutidines, and quinoline. Mixtures of such compounds may also be used.

The aromatic amines have been found to be of especial value in this connection and in particular aniline has been found to exercise a beneficial effect when used in conjunction with the solubilizer solutions.

No problem is encountered in recovering the separated components since the compounds which are rendered less volatile by the presence of the hydrotropic agent can be removed from the water-solubilizer phase by conventional methods as for example, stripping of the volatile compounds. One very excellent method is carried out simply by dilution of the hydrotropic solvent with water until a phase separation takes place and separation of the resulting phases to give the pure hydrocarbon which can then be subjected to drying. The compounds which are rendered more volatile can be recovered by removal as a vapor stream followed by condensation and separation of any aqueous phase which is so produced.

In using these solubilizers, a variety of methods may be employed for contacting the hydrocarbon feed mixtures with the aqueous solution of the solubilizer.

For more specific separations, as in the separation of close-boiling hydrocarbon mixtures boiling in a range of not more than 50 degrees on the centigrade scale, vapor-liquid processes are much to be preferred. This method commonly takes the form of an extractive distillation and is the preferred process. One modification of the method may be carried out by using a fractionating or rectifying column down which the aqueous mixture containing the hydrotropic agent is passed. The hydrocarbon feed, containing the close boiling mixture of hydrocarbons to be separated, is put into the column at an intermediate position.

The fractionating or rectifying tower used for carrying out the extractive distillation process should be supplied with suitable plates or packing for efficient countercurrent contact of liquid and vapor and should contain a substantial number of plates below the feed to give a stripping zone and a number of plates between the feed and solvent lines to act as a rectification zone. A third zone may also be provided in the column above the solvent supply line to provide for a water rectification section, although this is not absolutely necessary.

Vapor-liquid extraction methods employing these hydrotropic agents may be carried out at atmospheric, super-atmospheric, and sub-atmospheric pressures. Use of super-atmospheric pressures is advantageous in some cases in that it allows higher temperatures to be used to give higher solubilities of the hydrotropics salts and consequently higher solubilities of the hydrocarbons in the solvent are obtained. Sub-atmospheric pressures obviously would permit lower operating temperatures and usually provide better separations because of resultant wider spreads in volatilities. However, the decreased capacity of the aqueous phase for dissolving hydrocarbons may be a decided disadvantage. In general, it is desired to have as high a concentration of hydrocarbons as possible. Extractive distillation methods employing this improved process may be carried out at various temperatures ranging from below about 70° C. up to about 180° C.

It is a critical factor for successful operation of the process that there be maintained a single phase liquid system within the fractionation zone. Thus the concentration of aqueous solvent present is directly influenced by the solubility limitations of the hydrocarbon in the particular concentration of solubilizer solution or as it is called, the solvent, employed for the separation, since it is essential to stay below the concentration at which two phases, a hydrocarbon phase, and a solvent phase, would be formed. However, for efficient operation it is desirable to have as high a ratio of hydrocarbon to solvent as is possible to maintain and still stay within the one phase concentration limit. In most cases it is considered that a maximum value would be a 50 percent hydrocarbon concentration in the aqueous phase. Figure 1 shows the experimentally determined solubilities of ortho-xylene, of varying concentrations, in two selected solubilizer solutions.

For example, when operating at atmospheric pressure using sodium para-cymene sulfonate in the separation of isomeric xylene mixtures, the temperature will be 90°–100° C. In Figure 1 it can be seen that if 60 weight percent of the sodium para-cymene sulfonate is maintained in the aqueous or solvent phase, the hydrocarbon concentration can be as high as 12–13 percent. For sodium para-cymene sulfonate the upper solubility limit of orthoxylene is in the range of 20 percent for 69 percent of the salt in the aqueous phase.

Sodium para-cymene sulfonate has been found to be unique in its high hydrocarbon capacity at a given salt concentration which makes it the preferred solubilizer for chemical type separations and it is especially useful where at least one of the components of the mixture to be separated is aromatic in character.

Many different types of mixtures may be separated by the selective solvents of the invention. All that is necessary is that the presence of the solvent in the liquid mixture must cause a greater change in the "escaping tendency" of at least one component of the mixture relative to that of the others in the mixture. By "escaping tendency" is meant the potential of a component to pass from one phase to another as from the liquid to the vapor phase. Stated another way, the relative volatilities of the closely boiling components are so altered by the presence of the dissolved solubilizer that an efficient method of separation can be made of the components.

Obviously, since the method offers such outstanding advantages in giving excellent separations of closely boiling and chemically related components in mixtures, it is in the petroleum field where it has greatest applicability, although hydrocarbon mixtures obtained from other sources may also be separated readily using these methods. In addition, it offers a valuable supplement to other methods which give only poor separations. It is best to use a hydrocarbon mixture having no more than 100 degree spread in boiling range on the centigrade scale, and in most cases a range of not more than 50 degrees on the centigrade scale is more satisfactory. Ranges of not more than 20 degrees on the centigrade scale have been found to give the best results.

The method may be used to separate mixtures of hydrocarbons of one class from those of another class. For the purpose of discussing such separations hydrocarbons may be classified into classes such as polynuclear aromatics, mononuclear aromatics, diolefins, monoolefins, cycloparaffins, and paraffins. These classes are enumerated in the order of decreasing polarizability. That is, any hydrocarbon of the aromatic group might be expected to be more polarizable than any other compound in a class appearing later in the list, for instance a cycloparaffin or a paraffin. Consequently, being more easily polarizable, or distortable, in general it may be expected that any component of classes at the beginning of the list will be relatively less volatile in the presence of an aqueous solubilizer solvent than will be a component from any of the classes appearing later in the list. Thus, for instance, a compound of the aromatic class may be separated from mixtures containing diolefins, monolefins, cycloparaffins, and paraffins. Such class separations, in general, may be made with a variety of hydrotropic agents since the selectivity of any such assistant between classes is relatively high. However, it is not intended to limit this invention to any particular theory of operation. In general, aromatic hydrocarbons as a class may be separated from non-aromatic hydrocarbons as a class using this method. For example, in an extractive distillation of a mixture of ethylbenzene, n-nonane, and methylcyclohexane using, as the extractive solvent, a 60 percent aqueous solution of sodium para-cymene sulfonate, ethylbenzene will be rendered relatively less volatile and can be separated from the other two components which are rendered relatively more volatile.

By the use of the same solvent it is possible to separate such aromatic and paraffinic mixtures as n-nonane and ethylbenzene. In the separation of this mixture by extractive distillation, the n-nonane is rendered relatively more volatile and is removed overhead as a vapor stream while the ethylbenzene is rendered relatively less volatile and is recovered from the solubilizer solution. A similar separation can be made of mixtures containing substantial quantities of n-nonane and paraxylene.

Separations of close-boiling mixtures containing aromatic and naphthenic compounds such as benzene and cyclohexane may be effected using aqueous solutions of sodium para-cymene sulfonate. In this separation the cyclohexane is rendered relatively more volatile and is removed overhead as a vapor stream while the relatively less volatile benzene is removed with the solvent.

Similarly, mixtures of paraffinic and naphthenic hydrocarbons such as mixtures of n-heptane and methylcyclohexane can be separated by extractive distillation. In this case, the n-heptane is obtained overhead as a vapor stream and the methylcyclohexane is removed with the aqueous sodium para-cymene sulfonate solvent.

One separation is that of the diolefins from monoolefins. The diolefins are rendered relatively less volatile by the presence of the solubilizer permitting the monoolefins which are rendered relatively more volatile to be distilled.

A further application of this method is the separation of polynuclear compounds from mononuclear substances having comparable boiling points and molecular weights. The method may be used for separating mixtures of naphthalene and naphthalene derivatives from benzene derivatives by using a single hydrotropic agent or mixtures of such agents in an extractive distillation.

Other separations of close-boiling hydrocarbon mixtures which may be desirable and which may be effected by this extractive distillation technique are the separation of aromatic from olefinic compounds and olefinic from naphthenic compounds.

It is also possible to effect very specific separations of two or more chemical species all of which fall into one of the broader classes outlined above. In fact, it is in just such cases that the greatest practical advantages are obtained since other separation methods have limited applicability. Some of these specific separations have presented practical difficulties for many years. Separations of this type are encountered frequently in refinery operations where the trend toward production of chemical products from petroleum is assuming increased importance and relatively pure hydrocarbon raw materials are vital. This type of separation has wide versatility. The method may be used to separate either homologs or isomers. In separations of this type it is best to use a solubilizer whose hydrocarbon structure corresponds generally to the structure of the compound whose volatility it is desired to decrease. In applying this principle, it is frequently better to use a solubilizer with a structure corresponding generally to the higher boiling of the pure components since nothing is to be gained in attempting to reverse the volatilities.

There are many examples of specific separations of this type which can be made. In the paraffin class, it is possible to separate a straight chain compound from one or a number of closely boiling branched chain paraffins.

Another type of specific separation frequently encountered is in the cycloparaffin class where close boiling compounds having different cyclic structures are to be separated. For example, an alkyl cyclopentane may be separated from a closely boiling cyclohexane by using a properly selected solubilizer in aqueous solution and employing the extractive distillation technique.

The uses of this method are perhaps most numerous and valuable in the field of aromatic compounds where many isomeric mixtures occur. Many of these offer great difficulties in separating, especially since it is often highly desirable to obtain one or more of the isomers in a high state of purity. For instance, alkyl benzenes having eight, nine and ten carbons have heretofore required tedious stepwise separations to obtain sufficiently purified raw materials for chemical purposes. Such processes are expensive and time-consuming and often give a product of inferior quality and purity. Also many of the chemical separation methods which are used result in the loss of one or more of the other components as relatively worthless by-products.

Using this improved extractive distillation method, for example, a mixture including substantial amounts of ortho, meta, and para-xylenes and ethylbenzene, all compounds of the $C_8$ series, can be separated readily into the pure components. Or a mixture of propylbenzenes, trimethylbenzenes, and methylethylbenzenes, all of the $C_9$ series, can be separated. Similarly a mixture of the closely boiling trimethylbenzene isomers may be separated from each other by using the appropriate solubilizers. This is clearly indicated by the accompanying Table I which shows the enhancement of relative volatilities when certain solubilizer solutions are used with closely boiling compounds of the $C_8$ aromatic series.

Table I shows the relative volatilities of certain $C_8$ isomeric hydrocarbons in the presence of various aqueous solubilizer solutions. The alpha value is a measure of the relative volatilities of the components. Under ideal conditions, using distillation equipment which is capable of functioning as one theoretical plate, the alpha value of component A to component B may be defined as:

$$\text{Alpha} = \frac{\dfrac{\text{Mole fraction of A in vapor}}{\text{Mole fraction of B in vapor}}}{\dfrac{\text{Mole fraction of A in liquid}}{\text{Mole fraction of B in liquid}}}$$

TABLE I

*Relative volatilities of $C_8$ aromatics*

| Salt | Conc. (Wt. Per Cent) in H₂O | Alpha p/m-Xylene | Alpha p/o-Xylene |
| --- | --- | --- | --- |
| Na Sulfonates of Mixed C₈ Hydrocarbons | 65 | 1.04 | 1.35 |
| Na ortho-xylene Sulfonate | 40 | 1.08 | 1.58 |
| Na para-xylene Sulfonate | 40 | 1.12 | 1.48 |
| Na para-cymene Sulfonate | 67 | | 1.35 |
| Na para-toluene Sulfonate | 57 | 1.07 | 1.40 |
| Na para-ethyl benzene Sulfonate | 50 | 1.06 | 1.43 |
| Normal Alpha at 90° C | | 1.03 | 1.20 |

As a general rule, when very selective separations are being attempted, it has been found best to use as a solubilizer compound a homogeneous chemical entity, that is, an agent having one particular carbon skeleton rather than mixtures. However, when a less specific separation is required, as in class separations, it is usually not necessary to use pure solubilizers as mixtures of the appropriate compounds quite generally give satisfactory selectivity.

It has been noted that in certain cases the actual solubility properties of the solubilizer solution for the specific hydrocarbons have a more or less definite relationship to their relative volatilities. This has been found to be of especial importance in the separations involving the closely boiling C₈ aromatics.

While it would seem from various data obtained that the effects on the normal relative volatilities are more or less in line with the solubility of the hydrocarbon in any particular aqueous solubilizer solution, there is not, however, to be assumed a perfect correlation.

The solubilizing power of any particular solubilizer is directly related to the molecular weight of its hydrocarbon residue; the hydrocarbon solubility increasing with the increased molecular weight of the residue.

It should be noted that this method of using these organic solubilizers in extractive distillation processes to effect separation of closely boiling hydrocarbons is not limited to separations which yield the components in the final purified form. It may also be used along with well-known methods such as adsorption, distillation and crystallization. In certain cases it may be a very valuable tool when used in conjunction with such methods.

It is considered within the scope of the invention to use mixtures of especially adapted solubilizers in order to effect either complete removal or enrichment of a single hydrocarbon or hydrocarbon class from a complex hydrocarbon mixture.

In the application of such an extractive distilliation process to multicomponent mixtures, it is possible to remove some components either as a part of the overhead vapor stream or as a part of the aqueous solubilizer solution by proper choice of variables, such as plates in column employed, pressure, column operating temperatures, and composition of the feed stream.

The invention will be more clearly understood by reference to the following specific examples. These specific cases are illustrative only and are not intended to so limit the scope of the invention.

The relative volatility data were calculated from experimentally determined equilibrium vapor and liquid compositions. Analyses of hydrocarbon mixtures were performed by infra red absorption measurements.

*Example 1*

Figure 2:
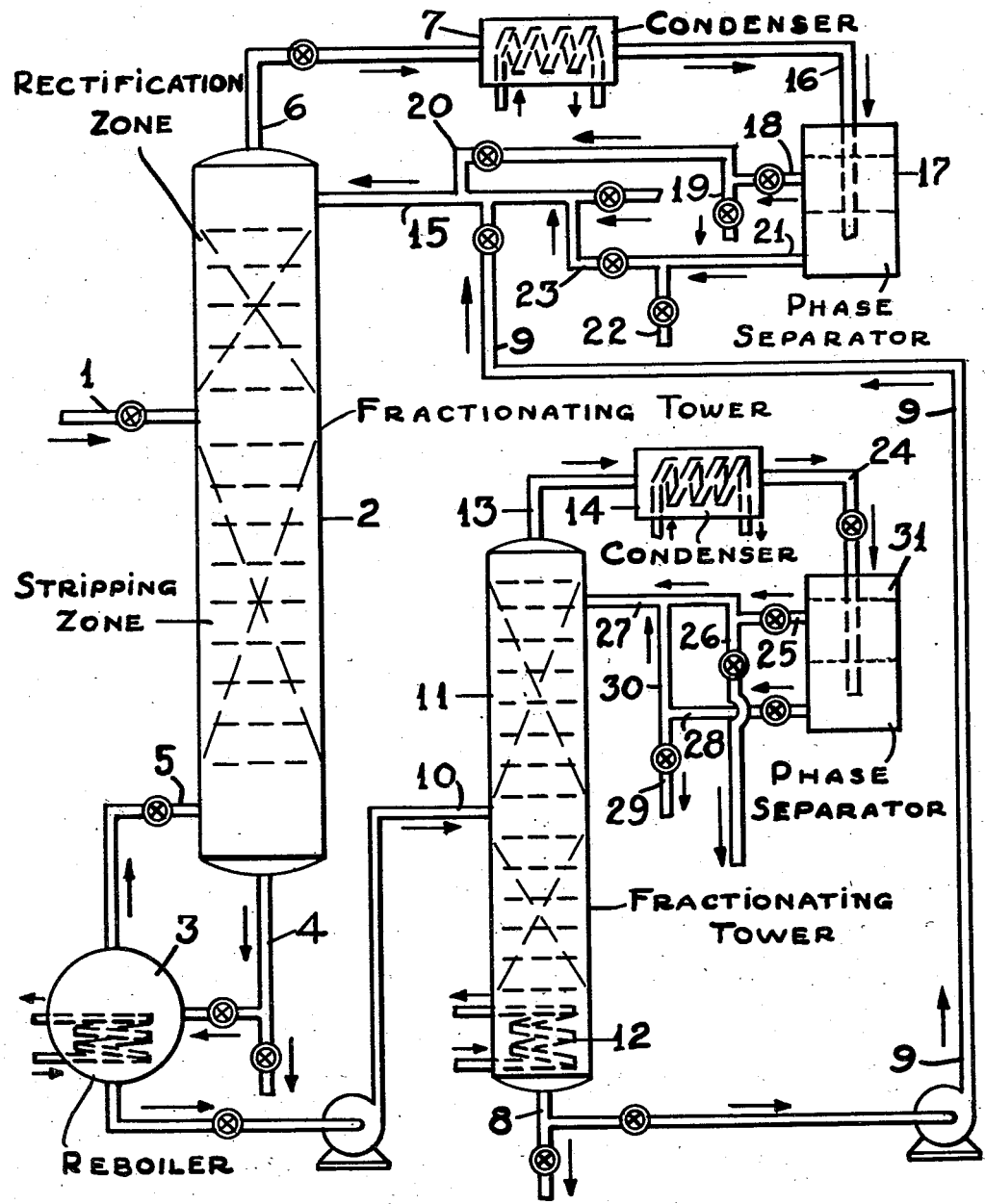

This example will be more fully understood by reference to the accompanying diagram in Figure 2 in conjunction with the following continuous extractive distillation process.

A close boiling aromatic hydrocarbon mixture consisting essentially of 80 weight percent of para-xylene (B. P. 137.7° C.) and 20 weight percent of ortho-xylene (B. P. 144° C.) is fed to fractionating bell-cap tower 2 at an intermediate inlet point 1. An approximately 40 weight percent water solution of sodium orthoxylene sulfonate is introduced in the column by inlet line 15. A reboiler 3 with suitable heating means is used to provide suitable continuous reflux within the column. In the presence of the sodium ortho-xylene sulfonate solubilizer the alpha value which can be defined as ratio of volatility of para-xylene to ortho-xylene was increased from a normal value of 1.20 to 1.58. Because of this increased volatility, an aqueous para-xylene enriched vapor stream can be removed from the top of the column through outlet line 6 and liquefied by means of condenser 7. The condensate is sent by line 16 to a continuous decanter 17 in which there is formed an upper hydrocarbon phase and a lower aqueous phase. The upper hydrocarbon phase is removed by line 18 and a part is returned as reflux to fractionating tower 2 by lines 20 and 15. A part is removed as a para-xylene enriched fraction by line 19. The lower aqueous layer is removed by line 21. All or part is returned by lines 23 and 15 to the column as reflux and if desired a part may be removed by line 22 to control salt concentration. From the bottom of the column there is removed through line 4 the aqueous solvent enriched in ortho-xylene. At least part of this mixture can be recycled back to the column through inlet 5 for heating purposes. A part of the mixture removed at 4 is introduced at an intermediate point 10 into the stripper fractionating column 11. This column 11 is provided with suitable heating means 12 to maintain temperatures sufficient to result in substantially complete stripping of an ortho-xylene enriched fraction from the aqueous solubilizer solution. An aqueous fraction greatly enriched in ortho-xylene is removed from the upper portion of the column by line 13, liquefied by condenser 14, and sent by line 24 to a continuous decanter 31. The upper hydrocarbon phase is removed by line 25 and a part may be recycled by line 27 back to fractionating tower 11 as reflux, while a portion is removed by line 26 as an ortho-xylene enriched fraction. From the lower portion of the continuous decanter there is removed an aqueous fraction by line 28, a major portion or all of which may be recycled back to the tower by lines 30 and 27. A part can be removed, if desired, by line 29. The lean aqueous solution is taken from the bottom outlet 8 of the stripper tower and, if desired, all or a part can be recycled through lines 9 and 15 back to the fractionating tower 2.

*Example 2*

The same type of equipment and operations can be used as those described in Example 1. However, in this case the solubilizer-solvent used is a 57 weight percent aqueous solution of sodium para-toluene sulfonate. Although the selectivity is not quite so great, the relative volatilities of para-xylene to ortho-xylene in mixtures are found to average 1.40, the exact value depending on the relative concentrations of each of the xylene isomers in the hydrocarbon feed mixtures.

A substantial separation of the isomers can be obtained when para-toluene sulfonate is employed in the extractive distillation. For a more complete separation to yield purer isomeric products, the extractive distillation can be repeated.

Certain other solubilizers can also be used to give appreciable separation of these two xylene isomers. Among those which are found useful for at least partial separations are sodium para-xylene sulfonate, sodium para-ethyl benzene sulfonate, and a commercially prepared sodium-xylene-sulfonate mixture.

*Example 3*

A close boiling hydrocarbon mixture consisting of varying amounts of para-xylene and meta-xylene is fed to a fractionating column. The normal relative volatility of para-xylene to meta-xylene is 1.03. When the extractive distillation is carried out using a 40 weight percent solution of sodium ortho-xylene sulfonate as the extractive solvent, the relative volatility is increased to an average value of 1.12. This enhanced volatility of para-xylene permits a substantial separation of the two isomers, since the extractive solvent will become preferentially enriched in meta-xylene while a para-xylene rich vapor is removed overhead from the column. This overhead product may be further fractionated using the same process, if desired.

Example 4

A hydrocarbon mixture of close boiling range and containing about 80 weight percent of para-xylene (B. P. 137.3° C.) and 20 weight percent of n-nonane (B. P. 150.7° C.) is charged to a fractionating still. The normal relative volatility of n-nonane to para-xylene in such a mixture is 0.73 under regular distillation conditions. When an extractive distillation is carried out using a 65 weight percent aqueous solution of a commercial mixed sodium xylene sulfonate as the extractive solvent, the relative volatility of n-nonane to para-xylene value becomes 5.00. The aqueous para-xylene-enriched phase can be removed from the lower portion of the still and overhead there can be removed an aqueous vapor stream consisting of substantially pure n-nonane which is later condensed. The aqueous phase is later subjected to a conventional stripping operation from which is obtained substantially pure para-xylene. The aqueous solution containing the solubilizer is recovered and recycled to the still. To obtain still more complete separation the n-nonane fraction can be refractionated under similar conditions.

Example 5

A hydrocarbon mixture consisting essentially of cyclohexane and benzene is charged to a fractionating still. In the presence of water, the relative volatility of cyclohexane to benzene has been experimentally determined to be about 1.00. When an extractive distillation is carried out using a 60 weight percent aqueous solution of sodium mixed xylene sulfonates as the extractive solvent, the relative volatility of the two hydrocarbon components is altered. This relative volatility value has been found to be 3.2 when the hydrocarbon solubility is of the order of 1.0 milliliter per 100 grams of sodium para-cymene sulfonate solution. Thus a benzene enriched solubilizer phase can be removed from the lower portion of the still and overhead there will be obtained an aqueous vapor stream greatly enriched in cyclohexane. This aqueous vapor stream is condensed and the cyclohexane separated and dried, if desired. The benzene enriched bottoms may be subjected to a stripping operation from which there is obtained an aqueous vapor rich in benzene. This vapor is condensed and the benzene recovered.

Example 6

A hydrocarbon mixture consisting essentially of n-heptane (B. P. 98.4° C.) and methylcyclohexane (B. P. 100.8° C.) is charged to a fractionating still. The normal relative volatility of n-heptane to methylcyclohexane is 1.07 under regular distillation conditions. When an extractive distillation is carried out using a 60 weight percent aqueous solution of sodium para-cymene sulfonate as the extractive solvent, the relative volatility of n-heptane to methylcyclohexane becomes approximately 1.70 when the hydrocarbon solubility is of the order of 2 milliliters per 100 grams of solvent. Thus a n-heptane enriched aqueous vapor stream is obtained overhead. This is condensed and the n-heptane enriched hydrocarbon phase recovered by phase separation, if desired. A methylcyclohexane enriched hydrocarbon fraction can be recovered by stripping the aqueous solubilizer solution obtained from the lower portion of the still.

We claim:

1. A process for the separation of close-boiling hydrocarbons which comprises subjecting a hydrocarbon mixture having a boiling range of not more than 50 degrees on the centigrade scale to extractive distillation using as extraction solvent an aqueous mixture containing in solution at least 40 per cent by weight of a hydrotropic organic solubilizer consisting essentially of a salt, containing at least one cyclic nucleus and having at least one water solubilizing group, whereby the relative volatilities of the components of the hydrocarbon mixture are altered and the components which are rendered relatively more volatile are separated from the components which are rendered relatively less volatile.

2. A process which comprises subjecting a mixture of close-boiling hydrocarbons of different degrees of polarizability to extractive distillation using as the extraction solvent an aqueous mixture containing at least 40 percent by weight of a water-soluble salt of an aromatic sulfonic acid, whereby the relative volatilities of the components of the hydrocarbon mixture are altered, and the components which are rendered relatively more volatile are separated from those which are rendered relatively less volatile by volatilization.

3. A process which comprises subjecting a mixture of close-boiling hydrocarbons of different degrees of polarizability to extractive distillation using as the extraction solvent an aqueous mixture containing in solution at least 40 percent by weight of a water-soluble salt of an aromatic sulfonic acid and an auxiliary solubilizer, whereby the relative volatilities of the components of the hydrocarbon mixture are altered, and those components which are rendered relatively more volatile are separated from those components which are rendered relatively less volatile by volatilization.

4. A process which comprises subjecting a mixture of close-boiling hydrocarbons of different degrees of polarizability and having a boiling range of not more than 50 degrees on the centigrade scale to extractive distillation using as the extraction solvent an aqueous mixture containing at least 40 per cent by weight of a water-soluble salt of an alkyl substituted mononuclear aromatic sulfonic acid, whereby the relative volatilities of the components of the hydrocarbon mixture are altered, and the components which are rendered relatively more volatile are separated from those which are rendered relatively less volatile by volatilization.

5. A process for the separation of close-boiling hydrocarbon fractions which comprises subjecting a hydrocarbon fraction of narrow boiling range and containing both aromatic and non-aromatic hydrocarbons to an extractive distillation using as the extraction solvent an aqueous mixture containing in solution at least 40 per cent by weight of a hydrotropic organic solubilizer consisting essentially of a salt having at least one water solubilizing group and at least one aromatic nucleus, whereby the aromatic components of the mixture are rendered relatively less volatile and the non-aromatic components of the mixture become relatively more volatile, and the components which are rendered relatively more volatile are separated from the components rendered relatively less volatile.

6. A process for the separation of close-boiling hydrocarbons which comprises subjecting a hydrocarbon mixture having a boiling range of not more than 50 degrees on the centigrade scale and containing both aromatic and non-aromatic hydrocarbons, to an extractive distillation using as the extraction solvent an aqueous mixture containing in solution at least 40 percent by weight of a water-soluble salt of a mononuclear aromatic sulfonic acid, whereby the aromatic components of the mixture are rendered relatively less volatile and the non-aromatic components of the mixture become relatively more volatile, and the components which are rendered relatively more volatile are separated from the components which are rendered relatively less volatile.

7. A process according to claim 6 in which the salt of the mononuclear aromatic sulfonic acid is sodium para-cymene sulfonate.

8. A process for the separation of close-boiling hydrocarbon fractions which comprises subjecting a hydrocarbon fraction of narrow boiling range and containing both aromatic and paraffinic hydrocarbons to an extractive distillation using as the extraction solvent an aqueous mixture containing in solution at least 40 percent by weight of a hydrotropic organic solubilizer consisting essentially of a salt having at least one water solubilizing group and at least one aromatic nucleus, whereby the more aromatic components of the hydrocarbon mixture are rendered relatively less volatile and the more paraffinic components become relatively more volatile, and those components which are rendered relatively more volatile are separated from those components which are rendered relatively less volatile.

9. A process for the separation of close-boiling hydrocarbons which comprises subjecting a hydrocarbon mixture having a boiling range of not more than 50 degrees on the centigrade scale and containing both aromatic and paraffinic hydrocarbons to an extractive distillation using as the extraction solvent an aqueous mixture containing in solution at least 40 percent by weight of a water-soluble salt of a mononuclear aromatic sulfonic acid, whereby the aromatic components of the hydrocarbon mixture are rendered relatively less volatile and the more paraffinic components are rendered relatively more volatile, and the components which are rendered relatively more volatile are separated from the components which are rendered relatively less volatile.

10. A process according to claim 9 in which the salt of the mononuclear aromatic sulfonic acid is sodium para-cymene sulfonate.

11. A process for the separation of close-boiling hydrocarbon fractions which comprises subjecting a hydrocarbon fraction of narrow boiling range and consisting essentially of aromatic and naphthenic hydrocarbons to an extractive distillation using as the extraction solvent an aqueous mixture containing in solution at least 40 percent by weight of a hydrotropic organic solubilizer consisting essentially of a salt having at least one water solubilizing group and at least one aromatic nucleus, whereby the aromatic components of the mixture are rendered relatively less volatile and the naphthenic components of the mixture become relatively more volatile, and the components which are rendered relatively more volatile are separated from the components which are rendered relatively less volatile.

12. A process for the separation of close-boiling hydrocarbons which comprises subjecting a hydrocarbon mixture having a boiling range of not more than 50 degrees on the centigrade scale and consisting essentially of aromatic and naphthenic hydrocarbons to an extractive distillation using as the extraction solvent an aqueous mixture containing in solution at least 40 percent by weight of a water-soluble salt of a mononuclear aromatic sulfonic acid, whereby the aromatic components of the mixture are rendered relatively less volatile and the naphthenic components of the mixture become relatively more volatile, and the components which are rendered relatively more volatile are separated from the components which are rendered relatively less volatile.

13. A process according to claim 12 in which the salt of the mononuclear aromatic sulfonic acid is sodium para-cymene sulfonate.

14. A process for the separation of close-boiling hydrocarbon fractions which comprises subjecting a hydrocarbon fraction of narrow boiling range and consisting essentially of naphthenic and paraffinic hydrocarbons to an extractive distillation using as the extraction solvent an aqueous mixture containing in solution at least 40 percent by weight of a hydrotropic organic solubilizer consisting essentially of a salt having at least one water solubilizing group and at least one aromatic nucleus, whereby the naphthenic components of the mixture are rendered relatively less volatile and the paraffinic components of the mixture become relatively more volatile, and the components which are rendered relatively more volatile are separated from the components which are rendered relatively less volatile.

15. A process for the separation of close-boiling hydrocarbons which comprises subjecting a hydrocarbon mixture having a boiling range of not more than 50 degrees on the centigrade scale and consisting essentially of napthenic and paraffinic hydrocarbons to an extractive distillation using as the extraction solvent an aqueous mixture containing in solution at least 40 percent by weight of a water-soluble salt of a mononuclear aromatic sulfonic acid, whereby the naphthenic aromatic components of the mixture are rendered relatively less volatile and the paraffinic components of the mixture become relatively more volatile, and the components which are rendered relatively more volatile are separated from the components which are rendered relatively less volatile.

16. A process according to claim 15 in which the salt of the mononuclear aromatic sulfonic acid is sodium para-cymene sulfonate.

17. A process which comprises subjecting a mixture of C$_8$ aromatic hydrocarbons of boiling range 130°–150° C. and containing, in substantial amounts, para-xylene and at least one other xylene isomer, to an extractive distillation using as the extraction solvent an aqueous mixture containing in solution at least 40 percent by weight of a water-soluble salt of a dialkyl mononuclear aromatic sulfonic acid, whereby the para-xylene is rendered relatively more volatile and the other xylene isomers, are rendered relatively less volatile, and the components which are rendered relatively more volatile are separated from the components which are rendered relatively less volatile by volatilization.

18. A process which comprises subjecting a mixture of xylene isomers containing, in substantial amounts, para-xylene and at least one other xylene isomer, to an extractive distillation using as the extraction solvent an aqueous mixture containing in solution at least 40 percent by weight of a water-soluble salt of a dialkyl mononuclear aromatic sulfonic acid, whereby the para-xylene is rendered relatively more volatile and the other xylene isomers are rendered relatively less volatile, and the components which are rendered relatively more volatile are separated from the components which are rendered relatively less volatile by volatilization.

19. A process which comprises subjecting a mixture of C8 aromatic hydrocarbons of boiling range 130°–150° C. and containing, in substantial amounts, ortho-xylene and at least one other C8 aromatic hydrocarbon, to an extractive distillation using as the extraction solvent an aqueous mixture containing in solution at least 40 percent by weight of a water-soluble salt of a dialkyl mononuclear aromatic sulfonic acid, whereby the ortho-xylene is rendered relatively less volatile and the other C8 aromatic hydrocarbons are rendered relatively more volatile, and the components which are rendered relatively more volatile are separated from the components which are rendered relatively less volatile by volatilization.

20. A process such as that described in claim 19 in which the water-soluble salt of the dialkyl mononuclear aromatic sulfonic acid is sodium para-cymene sulfonate.

21. A continuous extractive distillation process for the separation of close-boiling hydrocarbon which comprises introducing a hydrocarbon mixture having a boiling range of not more than 50 degrees on the centigrade scale, into an intermediate point of a fractionating zone, passing downwardly through said fractionating zone from a point above the hydrocarbon feed inlet, as an extractive solvent, an aqueous mixture of at least one hydrotropic organic solubilizer consisting essentially of a salt, containing at least one cyclic nucleus and having at least one water solubilizing group, maintaining continuous reboiling and refluxing within the zone whereby the relative volatilities of the hydrocarbon components of the feed mixture are altered, removing from an upper portion of the zone a vapor stream enriched in those hydrocarbon components which are rendered relatively more volatile and removing from a lower portion of the zone an aqueous solution of said sobubilizer enriched in those hydrocarbon components which are rendered relatively less volatile.

22. A continuous extractive distillation process for the separation of close-boiling hydrocarbons which comprises introducing a hydrocarbon mixture having a boiling range of not more than 50 degrees on the centigrade scale and containing both aromatic and non-aromatic components, into an intermediate point of a fractionating zone, passing downwardly through said fractionating zone from a point above the hydrocarbon feed inlet, as an extractive solvent, an aqueous mixture containing in solution at least 40 percent by weight of at least one water-soluble salt of an aromatic sulfonic acid, maintaining continuous reboiling and refluxing within the zone whereby the relative volatilities of the hydrocarbon components of the feed mixture are altered, removing from an upper portion of the zone a vapor stream enriched in the non-aromatic components which are rendered relatively more volatile, and removing from a lower portion of the zone an aqueous solution of said water-soluble salt enriched in the aromatic components which are rendered relatively less volatile.

23. A process such as that described in claim 22 in which the water-soluble salt of the aromatic sulfonic acid is sodium para-cymene sulfonate.

24. A process such as that described in claim 22 in which the extractive solvent is an aqueous mixture containing substantial amounts of at least two sodium sulfonates of C8 aromatic hydrocarbons.

25. A continuous extractive distillation process for the separation of close-boiling hydrocarbons which comprises introducing a mixture of C8 aromatic hydrocarbons of boiling range 130-150° C. and containing in substantial amounts para-xylene, and at least one other xylene isomer, into an intermediate point of a fractionating zone, passing downwardly through said fractionating zone from a point above the hydrocarbon feed inlet, as an extractive solvent, an aqueous mixture containing in solution at least 40 percent by weight of a water-soluble salt of a dialkyl mononuclear aromatic sulfonic acid, maintaining continuous reboiling and refluxing within the zone, whereby the relative volatilities of the hydrocarbon components of the feed mixture are altered, removing from an upper portion of the zone a vapor stream enriched in para-xylene which is rendered relatively more volatile, and removing from a lower portion of the zone an aqueous solution of said water soluble salt enriched in the C8 aromatic hydrocarbons which are rendered relatively less volatile, and including at least one xylene isomer other than para-xylene.

26. A continuous extractive distillation process for the separation of close-boiling hydrocarbons which comprises introducing a mixture of xylene isomers and containing in substantial amounts para-xylene and at least one other xylene isomer, into an intermediate point of a fractionating zone, passing downwardly through said fractionating zone from a point above the hydrocarbon feed inlet, as an extractive solvent, an aqueous mixture containing in solution at least 40 percent by weight of sodium para-cymene sulfonate, maintaining continuous reboiling and refluxing within the zone whereby the relative volatilities of the hydrocarbon components of the feed mixture are altered, removing from an upper portion of the zone a vapor stream enriched in para-xylene which is rendered relatively more volatile, and removing from a lower portion of the zone an aqueous solution of the said water-soluble salt enriched in those components which are rendered relatively less volatile and including at least one xylene isomer other than para-xylene.

27. A continuous extractive distillation process for the separation of close-boiling hydrocarbons which comprises introducing a mixture of C8 aromatic hydrocarbons of boiling range 130°–150° C., and containing in substantial amounts ortho-xylene, and at least one other xylene isomer, into an intermediate point of a fractionating zone, passing downwardly through said fractionating zone from a point above the hydrocarbon feed inlet, as an extractive solvent, an aqueous mixture containing at least 40 percent by weight of a water-soluble salt of a dialkyl mononuclear aromatic sulfonic acid, maintaining continuous reboiling and refluxing within the zone, whereby the relative volatilities of the hydrocarbon components of the feed are altered, removing from the lower portion of the zone an aqueous solution of said water-soluble salt enriched in ortho-xylene, which is rendered relatively less volatile, and removing from an upper portion of the column a vapor stream enriched in the C8 aromatic hydrocarbons which are rendered relatively more volatile and including one xylene isomer other than ortho-xylene.

CHARLES E. MORRELL.
CARL S. CARLSON.
JOSEPH F. NELSON.
JOSEPH STEWART.

REFERENCES CITED

The following references are of record in the file of this patent:

UNITED STATES PATENTS

| Number | Name | Date |
|---|---|---|
| 1,932,903 | McKee | Oct. 31, 1933 |
| 2,164,587 | McKee et al. | July 4, 1939 |
| 2,375,908 | Morris | Mar. 20, 1945 |

OTHER REFERENCES

Young and Coons, "Surface Active Agents," published 1945 by Chemical Publishing Co., Inc., Brooklyn, New York. (Copy in Div. 64, pages 89-91.)

McKee, "In re of Hydrotropic Solutions in Industry, Industrial and Engineering Chemistry," vol. 39, pp. 382-384 (Apr. 1946).

Booth et al., "Hydrotropic Solubilities," Industrial and Engineering Chemistry, vol. 40, pp. 1491-1493 (August 1940), 202/39.5.

Moor et al., "Extraction of 1, 3 Butadiene from Cracked Gases, II. Comparative Solubilites of 1, 3-Butadiene and Butenes." Transactions of the Research Plant "Khimgaz." Materials on Cracking and Chemical Treatment of Cracked Products, vol. 2, 260 pages, pages 157-167; Universal Oil Products Company, Survey of Foreign Petroleum Literature, Translation S-153, Feb. 6, 1942, seven pages. (Copy of Translation in Scientific Library, 183/115.6.)